US009061872B2

(12) United States Patent
Finkbeiner et al.

(10) Patent No.: US 9,061,872 B2
(45) Date of Patent: Jun. 23, 2015

(54) LIFTING DEVICE AND METHOD FOR TESTING AND MONITORING SUCH A LIFTING DEVICE

(75) Inventors: Gerhard Finkbeiner, Freudenstadt (DE); Josef Femböck, Neuötting (DE)

(73) Assignee: Gerhard Finkbeiner, Freudenstadt (DE)

( * ) Notice: Subject to any disclaimer, the term of this patent is extended or adjusted under 35 U.S.C. 154(b) by 0 days.

(21) Appl. No.: 13/515,136

(22) PCT Filed: Nov. 22, 2010

(86) PCT No.: PCT/EP2010/007059
§ 371 (c)(1),
(2), (4) Date: Sep. 14, 2012

(87) PCT Pub. No.: WO2011/069599
PCT Pub. Date: Jun. 16, 2011

(65) Prior Publication Data

US 2013/0001486 A1 Jan. 3, 2013

(30) Foreign Application Priority Data

Dec. 10, 2009 (DE) ......................... 10 2009 057 503
Jun. 11, 2010 (DE) ......................... 10 2010 023 436

(51) Int. Cl.

| | |
|---|---|
| ***B66F 13/00*** | (2006.01) |
| ***B66F 5/02*** | (2006.01) |
| ***B66F 5/04*** | (2006.01) |
| ***B60P 1/14*** | (2006.01) |
| ***G01M 1/38*** | (2006.01) |

(Continued)

(52) U.S. Cl.
CPC .... *B66F 3/25* (2013.01); *B66F 3/46* (2013.01)

(58) Field of Classification Search
USPC .............. 254/1, 2 B, 4 B; 187/210, 247, 277; 700/75
See application file for complete search history.

(56) References Cited

U.S. PATENT DOCUMENTS 4,334,667 A * 6/1982 Fox ............................... 254/8 B
4,486,004 A * 12/1984 Drewitz et al. ............... 254/2 B (Continued)

OTHER PUBLICATIONS

International Search Report for corresponding patent application No. PCT/EP2010/007059 dated Feb. 21, 2011.

*Primary Examiner* — Lee D Wilson
*Assistant Examiner* — Alvin Grant
(74) *Attorney, Agent, or Firm* — Renner, Otto, Boisselle & Sklar, LLP

(57) ABSTRACT

The invention relates to a lifting device for raising and lowering loads and to a method for testing and monitoring the lifting device (11), comprising a lifting unit (14) and a support (16) guided by the lifting unit (14), on which support a load-accommodating means (17) can be arranged, a drive unit (25), which moves the load-accommodating means (17) up and down, at least one energy store (29), which supplies at least the drive controller (25) with energy, a charging unit (36) for the at least one energy store (39), at least one actuator (23, 31) and/or at least one sensor (30), by means of which at least one stroke motion of the load-accommodating means (17) can be monitored, and at least one indicating device (49), which indicates at least individual operating states of the lifting device, wherein a drive controller (25) has a control circuit board (33), to which connections (41, 43, 46, 48) of the at least one energy store (29), of the charging unit (36), of the drive unit (15), which comprises at least one actuator (24, 31) and/or at least one sensor (30), and/or of the at least one indicating device (49) can be connected.

13 Claims, 4 Drawing Sheets

(51) Int. Cl.

| | |
|---|---|
| ***G05B 13/00*** | (2006.01) |
| ***B66B 1/00*** | (2006.01) |
| ***B66F 3/46*** | (2006.01) |
| *B66F 3/25* | (2006.01) |

(56) References Cited

U.S. PATENT DOCUMENTS

| | | | | |
|---|---|---|---|---|
| 4,573,663 | A * | 3/1986 | Nussbaum | 254/89 H |
| 4,598,784 | A * | 7/1986 | Tronich et al. | 180/19.2 |
| 5,335,755 | A * | 8/1994 | Miller | 414/249 |
| 5,518,220 | A * | 5/1996 | Bertrand et al. | 254/7 B |
| 5,638,387 | A * | 6/1997 | Palleggi et al. | 318/67 |
| 5,803,206 | A * | 9/1998 | Halstead et al. | 187/208 |
| 5,911,408 | A * | 6/1999 | Berends et al. | 254/2 B |
| 6,763,916 | B2 * | 7/2004 | Green et al. | 187/277 |
| 6,968,963 | B1 * | 11/2005 | Zakula et al. | 212/270 |
| 6,983,196 | B2 * | 1/2006 | Green et al. | 700/275 |
| 7,025,178 | B2 * | 4/2006 | Wengelski et al. | 187/277 |
| 7,191,038 | B2 * | 3/2007 | Green et al. | 700/275 |
| 7,461,733 | B2 * | 12/2008 | Dohi | 198/346.3 |
| 7,500,816 | B2 * | 3/2009 | Berends et al. | 414/458 |
| 7,644,807 | B2 * | 1/2010 | Finkbeiner | 187/277 |
| 7,740,109 | B2 * | 6/2010 | Moller et al. | 187/247 |
| 7,878,482 | B2 * | 2/2011 | Hernandez, Jr. | 254/93 H |
| 8,028,973 | B2 * | 10/2011 | Ford et al. | 254/89 R |
| 8,132,788 | B2 * | 3/2012 | Realegeno-Amaya | 254/134 |
| 8,141,850 | B2 * | 3/2012 | Drake | 254/4 B |
| 8,251,184 | B2 * | 8/2012 | De Jong | 187/210 |
| 8,282,075 | B2 * | 10/2012 | Chan | 254/2 B |
| 8,567,761 | B2 * | 10/2013 | De Jong et al. | 254/89 R |
| 2005/0045429 | A1 | 3/2005 | Baker | |
| 2006/0285959 | A1 * | 12/2006 | Warhurst | 414/540 |
| 2007/0096068 | A1 * | 5/2007 | Finkbeiner | 254/45 |
| 2009/0236183 | A1 | 9/2009 | Bordwell | |
| 2010/0102284 | A1 * | 4/2010 | Drake | 254/1 |
| 2012/0018688 | A1 * | 1/2012 | Finkbeiner | 254/1 |

* cited by examiner

LIFTING DEVICE AND METHOD FOR TESTING AND MONITORING SUCH A LIFTING DEVICE

The invention relates to a lifting device, in particular a single-column lifting platform, for raising and lowering loads, said apparatus forming a lifting system together with at least one further single-column lifting platform, and to a method for testing and monitoring such a lifting device, in particular for testing and monitoring a single-column lifting platform in a lifting system comprising at least one further single-column lifting platform.

Such a lifting system is known from DE 603 13 633 T2. This lifting system comprises at least two mobile lifting devices which have a lifting device with a support guided therein, on which the load receiving means can be arranged. The lifting and lowering movement of the load receiving means is controlled by a drive device. An energy store is provided on a basic frame and supplies energy to the drive device. The energy store can be charged by the public mains network via an additional cable when the lifting device is not in operation.

The individual components of the drive device are cabled or wired in such a way that the charging unit is connected directly to the energy store and the energy store is connected directly to the electric motor of the drive device to operate a hydraulic assembly which lifts and lowers the load receiving means. The electric motor is controlled by a control circuit board. This conventional wiring is very complex and only allows partial monitoring of the components of the lifting devices during the operating phase. Furthermore, in the event of damage to a control circuit board of the control device, costly onsite repairs have to be carried out by a skilled professional.

The object of the invention is to propose a lifting device, in particular a single-column lifting platform, in which a simple wiring of the individual components is enabled and which can be tested and monitored in a simple manner both before and during operation.

This object is achieved by a lifting device, in particular a single-column lifting platform, which forms a lifting system together with at least one further single-column lifting platform, in that the drive controller is formed with a control circuit board to which connectors of the components for operating the lifting device, such as at least one energy store, the charging device, the drive device, the at least one actuator and/or the at least one sensor and the display apparatus, are connectable. A star-like connector arrangement of the components to the control circuit board is thus created so that one or more connectors, one or more groups of connectors, or all connectors are consolidated on a single printed circuit board. Due to a simple detachment of the connectors at the control circuit board, it is easy to replace the entire control circuit board, and the connectors are pluggable in again in a simple manner once the new control circuit board has been installed. Such a replacement of a control circuit board can be undertaken on-site by the operating staff.

In a further preferred embodiment of the invention the control circuit board is formed as a plug-in module and is preferably arranged replaceably on a mounting plate, which can be attached to the lifting device. Should the control circuit board or individual control elements become damaged, this allows the entire controller device to be replaced in a simple manner. Due to the arrangement of the control circuit board preferably on a mounting plate on which further components, in particular the energy store, are also preferably arranged so as to be replaceable, good accessibility and simple replacement are enabled.

In accordance with a further preferred embodiment of the invention, at least one connector for the at least one energy store, a connector for the charging device and/or the sensors and/or the actuators, and a connector for an electric motor of the drive device are provided. Assembly and replacement of such a control circuit board are thus simplified.

In a further preferred embodiment of the invention, a connector for a display apparatus and/or a connector for an external test unit is/are provided on the control circuit board. Further external units can thus be connected directly to the control circuit board, whereby replacement of a control circuit board is simplified due to further defined interfaces.

It is further preferable for the control circuit board to have at least one connector for a further communication device, in particular a GPS or GSM module, or a radio device, or the like.

In a further preferred embodiment of the invention, at least the connectors for the charging device, for the at least one energy store, and for the electric motor of the drive controller are guided at the control circuit board to a current-sensing resistor, which is preferably coupled to an evaluation device. This has the advantage that a current profile of each connected component can be interrogated, for example in the idle state and in an operating phase. For example, resistance can be measured each time the lifting device is switched on or started up, whereby it is checked whether the individual lines to the components are in working order or faulty. In addition, the individual components can be interrogated and monitored before or during operation of the individual components.

It is further preferable for the connector for the wireless data transfer to be contacted at the control circuit board with the current-sensing resistor. A further improvement of the monitoring of the lifting device is thus enabled.

It is further preferable for the connector for the display device and/or a connector for an external test unit to be contacted at the control circuit board with the evaluation device. Integration in further connectors with components on the control circuit board can thus be enabled. For example, the evaluation device can transfer and output different signals, error messages or other information to the display apparatus. In addition, an external test unit, diagnosis unit or a storage unit can be connected, for example so as to carry out a diagnosis or software updates.

In accordance with a further preferred embodiment of the invention, the at least one energy store is connectable to a high-current plug. This means that the cable normally leading from the energy store directly to the electric motor of the drive device so as to control the hydraulic apparatus is guided via the control circuit board, whereby the energy consumption for activation of the control device can be monitored and, at the same time, the charged state of the energy store can be ascertained so as to display duly a recharging of the energy store at the display apparatus.

In accordance with a further advantageous embodiment of the invention, the control circuit board is formed as an emergency switch, wherein all connectors are arranged on the control circuit board in such a way that the control circuit board is disconnectable from all connectors by means of a simple detaching motion. This makes it possible to achieve emergency shutdown in a simple manner. At the same time however, simple re-start is thus also enabled. In addition, the control circuit board can be replaced completely by operating staff without the need for a specialist.

The object is further achieved in accordance with the invention by a method for testing and monitoring a lifting device, in particular a single-column lifting platform, for raising and lowering loads, said lifting device forming a lifting system together with at least one further single-column lifting platform, wherein, when the lifting device is switched on, a current profile of each connected component is interrogated and evaluated by an evaluation device on a control circuit board of the drive controller, to which the connectors of the at least one energy store, the charging device, the drive device, and the at least one sensor, and/or the at least one actuator are connected. Due to the different line cross-sections and the different resistances of the individual components, simple assignment of the interrogated current profiles to the connector lines and/or components is enabled. In addition, it is possible to establish, by way of self-diagnosis, whether the individual connector lines are in working order or are damaged and/or whether the individual components are still functional and connected. When the lifting device is switched on, a self-diagnosis is thus carried out and ensures that the further start-up for lifting and lowering loads is only implemented if the lifting device is detected as being in working order by the self-diagnosis.

In a further preferred embodiment of the invention, the current profile of the individual components is monitored before, during, or after the raising and lowering of the load receiving means. Individual states can thus be detected and, in particular, output on the display apparatus. Should individual states deviate from the permitted current profiles, an error message is output. In addition, not only can an error message be output, but the specific components which are faulty or which have caused the error message can also be displayed.

In a further preferred embodiment of the invention, the charged state of the at least one energy store is interrogated and monitored. The charged state of the energy store is detected before and/or during operation and also after operation by the central feed of all connectors or lines of the lifting device via the control circuit board. If the charged state falls below a predetermined threshold value, a signal to charge the energy store is thus output, the threshold value being set in such a way that the operating cycle can still be completed in a controlled manner.

In accordance with a further preferred embodiment of the method, the charged state of the energy store is ascertained by the evaluation device of the control circuit board during a charging operation of the at least one energy store and the charging device is controlled by the evaluation device. This means that a single power unit is sufficient, thus resulting in a cost reduction.

The invention and further advantageous embodiments and developments thereof will be described and explained in greater detail hereinafter with reference to the examples illustrated in the drawings. In accordance with the invention, the features to be inferred from the description and from the drawings can be applied individually or together in any combination. In the drawings.

Figure 1:
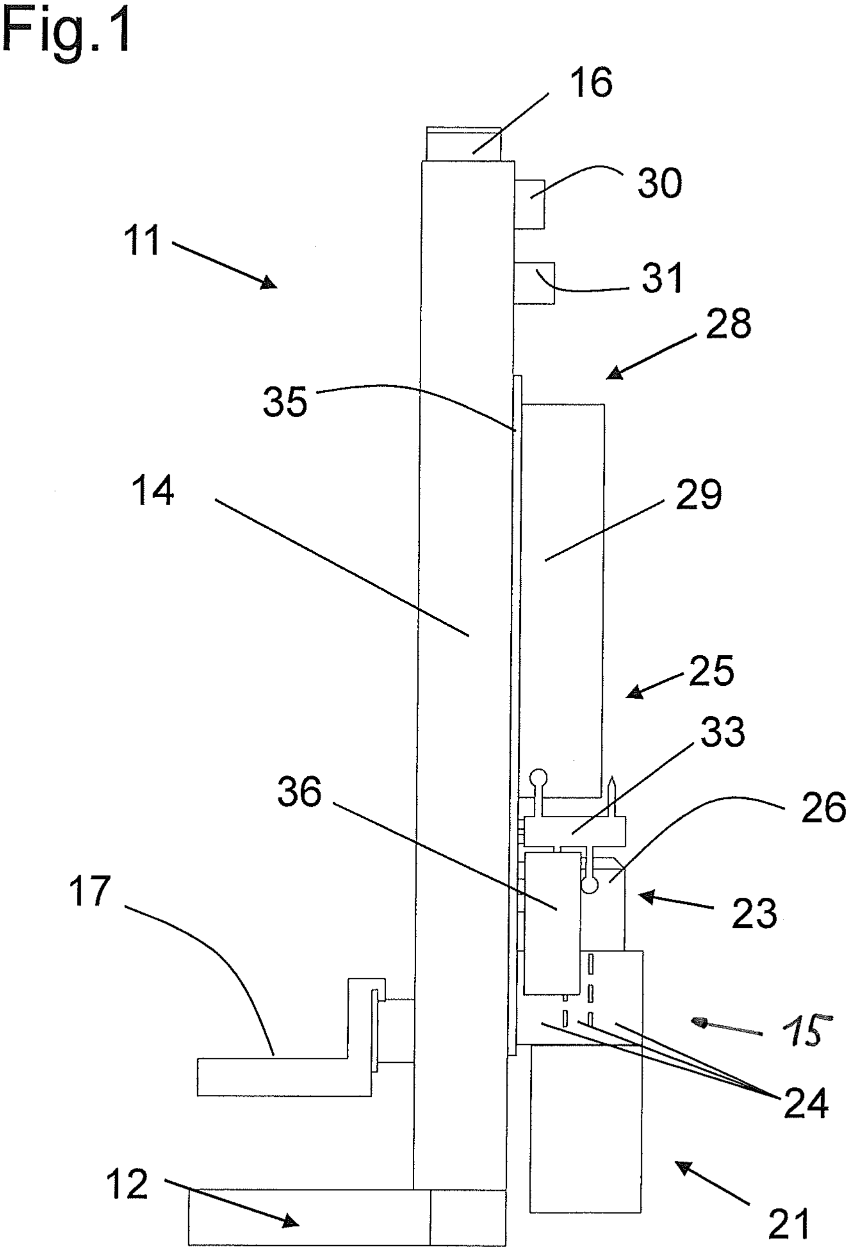
FIG. 1 shows a schematic side view of a lifting device.

A schematic side view of a lifting device 11 according to the invention is illustrated in FIG. 1 by way of example as a single-column lifting platform which is suitable in particular for mobile use. Such a single-column lifting platform 11 forms a lifting system together with at least one further single-column lifting platform 11. The single-column lifting platforms 11 are preferably arranged opposite one another in pairs and are assigned to one another accordingly in pairs, for example according to a number of axles of a vehicle, and are arranged relative to the axles of the vehicle so as to raise it.

The single-column lifting platform 11 has a base device 12 which, according to the exemplary embodiment, preferably comprises a chassis or a steering chassis. Alternatively, the base device 12 can also be formed as a bearing plate or fixing plate, on which the single-column lifting platform 11 is fixed relative to the floor of a workshop or of a mobile or stationary working area. A lifting column 14 is provided on the base device 12. A drive device 15 is fixed on the lifting column 14 and moves a support 16 up and down relative to the lifting column 14. A load receiving means 17 is provided on the support 16 and engages beneath a load to be lifted. The load receiving means is preferably formed as a wheel engaging element. Other applications are also possible.

The drive device 15 comprises a hydraulic assembly 21 which drives a drive cylinder which is preferably arranged within the support 16. Alternatively, the drive device can also be formed as an electric or mechanical drive so that, for example, a spindle drive or the like can also be controlled. A hydraulic controller 23 is provided to control the hydraulic assembly 21 and is controlled by a drive controller 25. Actuators 24, such as a proportional valve, a lowering valve, and/or a motor control valve, are provided for hydraulic control of the drive device 15.

An electric motor 26 is provided between the drive controller 25 and the hydraulic controller 23 and in turn drives the hydraulic assembly 21. A rapid-change device 28 is provided above the drive controller 25 and receives, exchangeably, one or more energy stores 29 for supplying energy to the single-column lifting platforms 11. This rapid-change device 28 may also be provided as part of a mounting plate 35 or as a mounting plate 38 for receiving the energy store 29 and/or the drive controller 25 and/or the drive device 15. The mounting plate 38 can also be fixed on the lifting column 14 in a simple manner, wherein the components of the drive device 15 can be pre-assembled on the mounting plate 35.

For example, a sensor 30 for detecting an upper stroke end position is provided at the upper end of the lifting column 14. Furthermore, an actuator 31 is provided at the upper end of the lifting column 14 and is formed as a drop guard and comprises a release magnet. This release magnet is driven by a coil, and the coil can thus also be used as a sensor to interrogate the position of the drop guard.

The drive controller 25 comprises a control circuit board 33, which can preferably be fitted on the mounting plate 35 and is thus fixed so as to be easily replaceable. A charging device 36 for the at least one energy store 29 is also fixed exchangeably on the mounting plate 35. The drive controller 25 controls the entire operation of the lifting device 11.

Figure 2:
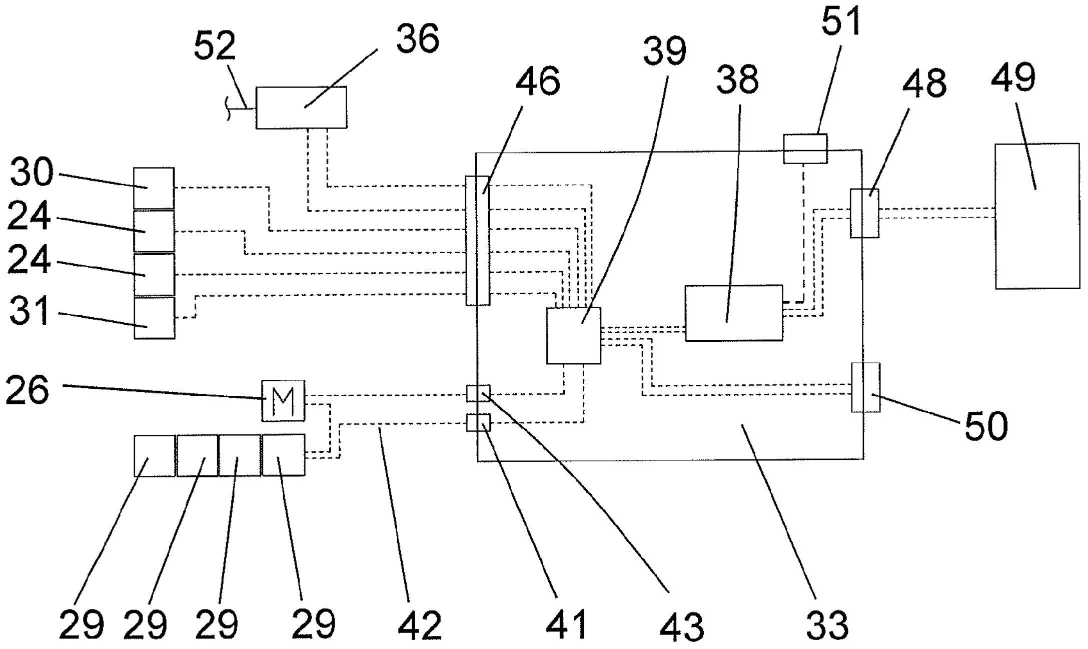
FIG. 2 shows a schematic view of a control circuit board of a control device with components of the lifting device connected thereto.

A schematic view of the control circuit board 33 of the drive controller 25 with the components connected thereto is illustrated in FIG. 2.

The control circuit board 33 is formed as a plug-in module and can be fixed to the mounting plate 35 by plugging in and fitting. This control circuit board comprises a plurality of circuit components, in particular microprocessors, of which only an evaluation device 38 and a current-sensing resistor 39 are illustrated. The control circuit board 33 has a connector 41, in particular a high-current connector, to which a cable 42 connected to the at least one energy store 29 is connected. A further connector 43 leads to the electric motor. The charging current fed by the energy store 29 is guided to the electric motor 26 via the current-sensing resistor 39. A high-current circuit is thus formed which is guided via the control circuit board 33.

A further connector 46, in particular a plug-in connector, is provided on the control circuit board 33 and the at least one sensor 30 and the at least one actuator 31 are connected to said further connector. The charging device 36, which for example is connected to a network connector via a charging cable 52, is also connected to the plug-in connector 46. Alternatively, autonomous energy generators such as solar modules, emergency power units and the like can supply the charging current. In addition, further sensors, such as a load cell or a temperature sensor, can also be connected to this plug-in connector 46. The plug-in connector 46 is in turn connected to the current-sensing resistor 39, and therefore all components connected to said plug-in connector are contacted with the current-sensing resistor 39.

A connector 48, in particular a plug-in connector, is also provided on the control circuit board 33 and leads to the display apparatus 49, in particular an LCD display, on which different switching states and information regarding the single-column lifting platforms can be displayed. In addition, one or more further interfaces or connectors 50 can be provided, such as a serial interface RS-485, so that further components can be connected thereto. For example, a GPS, a GSM, and/or a radio module or the like can be connected.

The control circuit board 33 may also comprise a connector 51 which is formed as a service, diagnosis, and/or update plug-in connector. Once an external unit has been connected, error diagnosis can thus be carried out for example. Further software updates can also be implemented in this manner. Radio modules or the like can also be connected to this connector so as to enable external safety monitoring.

Due to this arrangement of the connector lines of the individual components to the control circuit board 33, all electrical components which can be controlled on the single-column lifting platform 11 are connected to the control circuit board 33. This enables a star-like arrangement of the connector lines relative to the control circuit board 33. The complexity of the cabling of the individual components on the lifting column 14 is thus simplified. In particular, the lifting column itself 14 can be used as a negative pole or as a neutral conductor so that a further saving in terms of the installation of lines to the individual components can also be achieved. Furthermore, this star-like arrangement and central feed of the individual connector lines to the control circuit board 33 has the advantage that all connectors can be guided in a simple manner via at least one current-sensing resistor 39, which forwards the detected current signals of the connected components to an evaluation device 38. Self-diagnosis of the connected components can thus be enabled when the single-column lifting platform 11 is switched on, by interrogating the individual connected components in succession. Due to the different line cross-sections and the different potentials of the components connected thereto, the state of the respective components can be interrogated and ascertained from the respective ascertained current profile. Such an interrogation and monitoring can also take place during operation of the single-column lifting platform 11 and evaluated by the evaluation device 38. Furthermore, it is possible to replace such a control circuit board 33 in a simple manner due to the connection of the individual components via connectors, in particular-plug-in connectors. Once the connectors have been detached, the control circuit board 33 can be removed from the mounting plate 38 and replaced by a new control circuit board. The connectors are attached without difficulty, since none of the connectors are identical and it is therefore impossible for them to be confused.

This star-like arrangement of the individual components on the control circuit board 33 further has the advantage that the charging current runs via the current-sensing resistor, for example during the charging of the at least one energy store 29 by a charging device 36 which can be connected to a public mains network or to a generator or the like. The charging current and the charged state of the energy store 39 are monitored by the evaluation device. Merely the charging device 39 can thus be formed as a power unit in a simple manner.

The embodiment of the control circuit board 33 also makes it possible for a motor current for the electric motor 26 of the drive device 15, a charging current for the energy store 29, and a supply current for the sensors 30 and/or actuators 24, 31 to be guided together via the control circuit board 33, whereby complete monitoring and diagnosis of the components of the single-column lifting platform 11 and ascertainment of an energy balance of the energy store 29 are enabled.

In the case of the arrangement of a GSM module or of a further computer with Internet access, remote maintenance and remote diagnosis and possibly installation of a new program version for controlling the single-column lifting platform 11 as well as interrogation of an operating protocol are also possible.

The control circuit board 33 preferably has a line structure and an arrangement of the connectors 41, 43, 46, 48 and/or 50 which are arranged in such a way that the control circuit board 33 is formed as an emergency switch. This means that all connected components can be easily separated via their connectors by simple detachment of this control circuit board 33. This advantageous embodiment of the control circuit board 33 makes it possible to dispense with a separate embodiment of an emergency switch.

Figure 3:
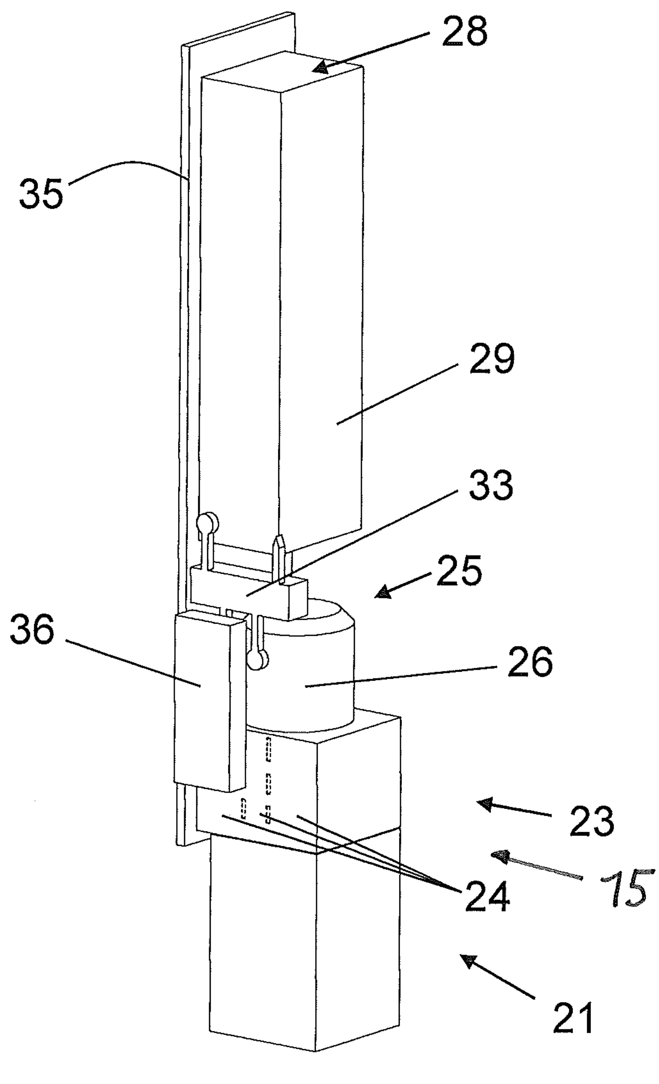
FIG. 3 shows a perspective view of a mounting plate of the lifting device.
Figure 4:
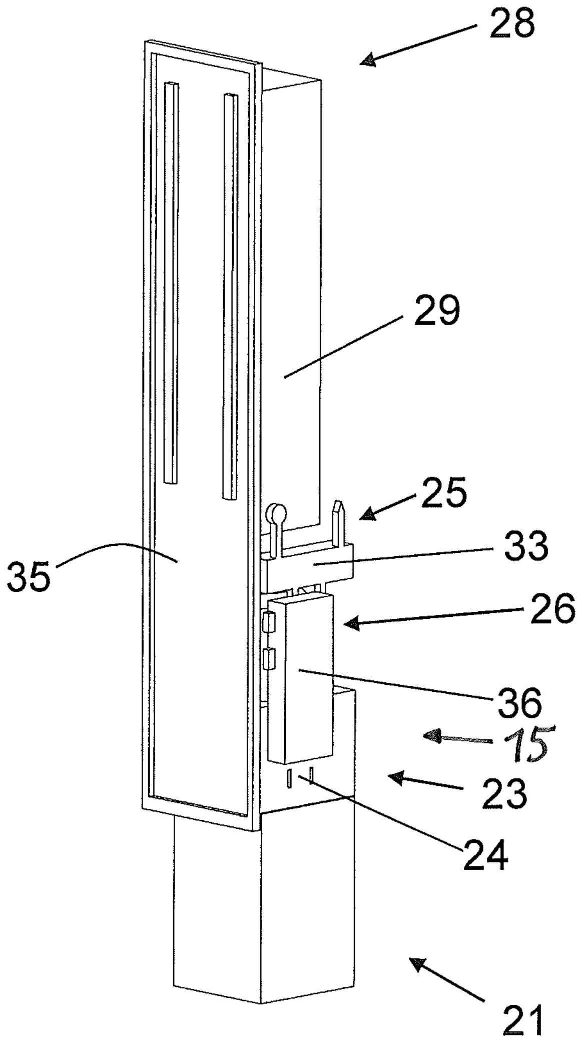
FIG. 4 shows a further schematic view of a mounting plate of the lifting device according to FIG. 3.

In FIGS. 3 and 4, the mounting plate 35 is illustrated with the components of the single-column lifting platform 11, these components being arrangeable on said mounting plate for example. This arrangement in FIGS. 3 and 4 forms a module which can be pre-assembled and which can also be tested in terms of function. This pre-assembled module can thus be mounted directly on the lifting column 14 of the single-column lifting platform in a simple manner. Alternatively, the mounting plate 35 can also be formed in two parts, for example so that the hydraulic control is arranged separately on a mounting plate.

The aforementioned embodiment of the control circuit board 33 for lifting devices 11 can be provided in particular in the case of single-column lifting platforms, rail platforms and further lifting devices for the lifting of vehicles of any type and for special-purpose vehicles.

The invention claimed is:

1. A lifting apparatus for raising and lowering loads, comprising a lifting device including a support on which a load receiver is arrangable, and a drive device which moves the support for moving the load receiver up and down, at least one energy store, which supplies energy at least to a drive controller, a charging device for the at least one energy store, at least one actuator or at least one sensor, with which at least one movement of the support is monitored, and at least one display apparatus, which displays at least individual operating states of the lifting apparatus, wherein the drive controller has a control circuit board having at least one current-sensing resistor and at least one connector to which connectors of the at least one energy store, the charging device, and an electric motor of the drive device are removably connected, and wherein the control circuit board is configured to guide currents passing through the connectors of the charging device, the at least one energy store, and the electric motor of the drive device to the current-sensing resistor.

2. The lifting apparatus according to claim 1, wherein the control circuit board is formed as a plug-in module and is arranged replaceably on a mounting plate, which is attachable to the lifting device.

3. The lifting apparatus according to claim 1, wherein the control circuit board has at least one connector to which a connector of the at least one sensor or a connector of the at least one actuator is removably connected.

4. The lifting apparatus according to claim 1, wherein the control circuit board has at least one connector to which a connector of the display apparatus or a connector of an external test unit, or both, are removably connected.

5. The lifting apparatus according to claim 1, wherein the control circuit board has at least one connector for a communication device.

6. The lifting apparatus according to claim 1, wherein the at least one current-sensing resistor is connected to an evaluation device.

7. The lifting apparatus according to claim 1, wherein the control circuit board has a further connector for a wireless data transfer device and is configured to pass current passing through the further connector to the at least one current-sensing resistor.

8. The lifting apparatus according to claim 1, wherein the connector for the display device or a connector for an external test unit, or both, is/are connected at the control circuit board with an evaluation device.

9. The lifting apparatus according to claim 1, wherein the at least one energy store and an electric motor of the drive controller are connectable to a high-current plug on the control circuit board.

10. The lifting apparatus according to claim 1, wherein the control circuit board is disconnectable simultaneously from all connectors, thereby forming an emergency switch.

11. A method for testing and monitoring a lifting apparatus for lifting and lowering loads, said lifting apparatus forming a lifting system together with at least one further single-column lifting platform, a lifting device with a support guided in the lifting device, on which a load receiver is arrangable, a drive device for moving the support for moving the load receiver up and down, at least one energy store for supplying energy at least to the drive device, a charging device for the at least one energy store, at least one actuator or at least one sensor for monitoring at least one movement of the support, and a display apparatus displaying at least individual operating states of the lifting apparatus, the method comprising the steps:

switching on the lifting apparatus using an evaluation device on a control circuit board for interrogating current flow through at least one connector to which the at least one energy store, the charging device, and an electric motor of the drive device are connected, providing a current profile of the at least one energy store, the charging device and the electric motor of the drive device, and using the evaluation device for ascertaining the current profile and monitoring the current profile by at least one current-sensing resistor before, during, or after the raising or lowering of the load receiver.

12. The method according to claim 11, wherein the evaluation device is interrogating and mounting a charged state of the at least one energy store.

13. The method according to claim 11, wherein the evaluation device is monitoring the charged state of the at least one energy store during a charging operation of the at least one energy store and is controlling the charging device.

* * * * *